United States Patent [19]

Rickelton et al.

[11] 4,382,016

[45] May 3, 1983

[54] EXTRACTANT FOR THE SELECTIVE REMOVAL OF COBALT(II) FROM AQUEOUS SOLUTIONS

[75] Inventors: William A. Rickelton, Niagara Falls; Allan J. Robertson, Thorold, both of Canada; David R. Burley, Kinnelon, N.J.

[73] Assignee: American Cyanamid Company, Stamford, Conn.

[21] Appl. No.: 391,270

[22] Filed: Jun. 23, 1982

Related U.S. Application Data

[60] Division of Ser. No. 263,528, May 14, 1981, Pat. No. 4,348,367, which is a continuation-in-part of Ser. No. 182,296, Aug. 28, 1980, abandoned.

[51] Int. Cl.$^3$ ............................................. C01G 51/00
[52] U.S. Cl. ................................... 252/428; 252/426; 252/431 P
[58] Field of Search ................ 423/139, DIG. 14; 210/634, 643; 260/502.4; 252/426, 428, 431 P

[56] References Cited

U.S. PATENT DOCUMENTS

| 3,931,196 | 1/1976 | Swan | 260/502.4 |
| 3,960,762 | 6/1976 | Kroebel | 252/426 |
| 3,966,659 | 6/1976 | Reinhardt | 423/139 |
| 4,051,230 | 9/1977 | Miyauchi | 423/139 |
| 4,058,585 | 11/1977 | MacKay | 423/139 |
| 4,196,076 | 4/1980 | Fujimoto | 423/139 |
| 4,268,395 | 5/1981 | Stewart | 423/139 |

FOREIGN PATENT DOCUMENTS 871963 1/1979 Belgium .
738500 10/1955 United Kingdom .

OTHER PUBLICATIONS

Hayworth, Paper Presented at A.C.S. Annual Meeting, San Francisco, Ca., 8/28/80.
Peppard, J. Inorg. Nucl. Chem. (1959), vol. 12, pp. 60–70.
Blake, Proc. Int. Conf. on Peaceful Uses of Atomic Energy, (1958), vol. 28, pp. 289–298.
Brochure "Karr Column: Countercurrent and Fraction Liquid Extraction", Chem. Pro Corp., N.J.
Karr, A.I.Ch.E. Journal, vol. 5, (1959), pp. 446–452.
TMS Paper A81-29, A.I.M.E., Warrendale, Pa., (Jan. 1981).
Bock et al., Paper Presented at Second Chemical Congress of the North American Continent, 8/28/80.

*Primary Examiner*—Patrick Garvin
*Attorney, Agent, or Firm*—Michael J. Kelly

[57] ABSTRACT

Cobalt(II)-bearing aqueous solutions may be treated with an extractant comprising an organic-soluble phophinic acid, or a salt thereof, to separate the cobalt(II) from the aqueous solution. Typical extraction techniques compatible with the instant process include liquid-liquid extraction employing either mixer settlers or columns, packed beds of supported extractants as in ion exchange, liquid membrane extraction and selective supported membrane extraction.

3 Claims, No Drawings

EXTRACTANT FOR THE SELECTIVE REMOVAL OF COBALT(II) FROM AQUEOUS SOLUTIONS

CROSS-REFERENCE TO RELATED APPLICATION

This is a division of application Ser. No. 263,528, filed May 14, 1981 and now U.S. Pat. No. 4,348,367, which in turn is a continuation-in-part of application Ser. No. 182,296, filed Aug. 28, 1980 and now abandoned.

BACKGROUND OF THE INVENTION

The present invention relates to hydrometallurgy. More particularly, it relates to the recovery of metals from aqueous solutions by extraction techniques and subsequent scrubbing and stripping of the metal-loaded extractant.

The extraction of cobalt(II) from leach liquors containing nickel(II), by means of water-immiscible organic solutions containing bis(2-ethylhexyl)hydrogen phosphate, is well-known in the art. However, the relatively poor selectivity of this reagent has limited its application by solvent extraction to leach liquors containing nickel(II)/cobalt(II) ratios below 5. Even in these liquors, the process requires expensive, multistage contacting devices to achieve a cobalt (II)/nickel(II) ratio of about 1,000 in the final product.

With leach liquors containing higher nickel(II)/cobalt(II) ratios, for example 50/1, separation of cobalt(II) by solvent extraction can only be achieved using amines and a chloride leach liquor. However, in the chloride systems corrosion is a problem. Alternatively, the Outokumpu Oy hydrometallurgical process may be used, but it is expensive.

The major advantage of the process of Belgian Pat. No. 871,963 over the use of bis(2-ethylhexyl)hydrogen phosphate lies in the much greater selectivity of cobalt(II) extraction over nickel(II) extraction by the use of phosphonates. The separation factor obtained with the phosphonates is an order of magnitude higher than that obtained with bis(2-ethylhexyl)hydrogen phosphate. There is still a need, however, for other extractants that have high selectivity for the separation of cobalt(II) from nickel(II), and will allow most of the cobalt(II) to be stripped from the extract with a mineral acid.

SUMMARY OF THE INVENTION

The present invention provides a process for the removal of cobalt(II) from an aqueous cobalt(II)-bearing solution comprising contacting said solution with an extractant wherein said extractant employed comprises an organic-soluble phosphinic acid having at least 6 carbon atoms or a salt thereof.

The present invention also provides a process, as described above, with the additional steps of contacting the cobalt(II)-loaded extractants; prior to separation with an aqueous solution of a cobalt(II) salt of a mineral acid to remove co-extracted metals ions from the loaded extractant to the aqueous phase; separating the aqueous phase from the cobalt(II)-loaded extractW ant; and thereafter recovering the scrubbed cobalt(II)-loaded extractant.

The present invention also provides processes, as described above, with the additional steps of contacting the residual cobalt(II)-loaded organic solution, or scrubbed cobalt(II)-loaded extractant, with an aqueous solution of a strong mineral acid to strip the cobalt(II) into the aqueous acidic phase; separating the aqueous acidic phase containing water-soluble cobalt(II) salts; and, recovering the stripped organic phase for subsequent reuse in the extraction of another aqueous solution.

DETAILED DESCRIPTION OF THE INVENTION

In carrying out the processes of the present invention, extraction techniques believed compatible with an extractant comprising an organophosphinic acid include, but are not limited to, liquid-liquid extraction employing either mixer settlers or columns, such as the reciprocating-plate extraction column, pulse columns or columns employing rotating impellers; packed beds of supported extractants wherein the support can be an inert material, such as diatomaceous earth, or a polymer such as crosslinked polystyrene, the latter approach being more explicitly described in U.S. Pat. No. 3,960,762 issued to Kroebel et al. in 1976; liquid membrane extraction as described by Bock, Valint and Hayworth of Exxon Research and Engineering Company; and selective supported membrane extraction as described by Obermayer, Nichols, Allen and Caron of the Moleculon Research Corporation.

The extractant itself is an organic-soluble phosphinic acid or the organic-soluble salt thereof. The free phosphinic acids and their alkali metal or ammonium salts are preferred, but other salts such as nickel or tetrabutylammonium salts may be employed if desired. Although pure extractant can be used, it is generally preferred to employ an extraction solvent comprising from about 2 to 99 parts by volume of extractant with from about 98 to 1 parts by volume of a water-immiscible organic diluent, preferably from about 2 to 70 parts by volume of the extractant with from about 98 to 30 parts by volume of diluent. The extraction solvent may optionally contain from 1 to 15 parts by volume of a phase modifier to promote the separation of the phases and/or increase the solubility of the extracted cobalt(II) salt in the organic phase. If a phase modifier is employed, the amount of organic diluent used should be reduced by a corresponding amount.

Generally, a wide variety of water-immiscible organic liquids may be used as the diluent. Suitable diluents include, but are not limited to, carbon tetrachloride, toluene, xylene, kerosene, naphtha, tridecanol, methylisobutylketone, tributylphosphate, cyclohexane, decane, pyridine, dibromoethane, and the like. Preferably, the diluent is an aliphatic or aromatic petroleum distillate. Suitable phase modifiers, when employed, include: tributylphosphate, trimethylphosphine oxide, tributylphosphine oxide, trihexyl phosphine oxide, trioctylphosphine oxide, isodecanol, and the like. The preferred process employs dicyclohexylphosphinic acid which is more soluble in aromatic (e.g., Exxon Aromatic 100 and 150) than in aliphatic diluents.

The organic-soluble phosphinic acid or salt thereof is generally represented by the following structure:

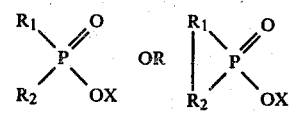

wherein $R_1$ and $R_2$ are individually substituted or unsubstituted alkyl cycloalkyl, alkoxyalkyl, alkylcyclo alkyl, aryl, alkylaryl, aralkyl or cycloalkylaryl radicals and X is either hydrogen or a salt-forming radical. Preferably, the organic-soluble phosphinic acid is dicyclohexylphosphinic acid since it demonstrates significant selectivity and separates cobalt against calcium without leaving behind precipitates of calcium salts at the interface.

Typical organophosphinic acids within the purview of the present invention include, but are not limited to: dimethyl; diethyl; di-n-propyl; diisopropyl; di-n-butyl; diisobutyl; di-n-pentyl; di-n-hexyl; di-n-heptyl; di-n-octyl; di-n-nonyl; di-n-decyl; di-n-dodecyl; di-n-tetradecyl; di-n-hexadecyl; di-n-eicosyl; bis(2,4,4-trimethylpentyl); (2,4,4-trimethylpentyl) cyclohexyl; (2,4,4-trimethylpentyl) octyl; dicyclopentyl; dicyclohexyl; dicyclooctyl; cyclohexyl, n-butyl; cyclopentyl; n-dodecyl; cyclooctyl ethyl; 2,4,6-triisopropyl-1,3,5-dioxaphosphorinane, 5-hydroxy, 5-oxide; cyclohexyl, phenyl; cyclopentyl-p-tolyl; cyclooctyl-p-chloropenyl; diphenyl; di-o-tolyl; di-m-tolyl; di-p-tolyl; bis(2,3-dimethylphenyl); bis(2,4-dimethylphenyl); bis(2,5-dimethylphenyl); bis(2,6-dimethylphenyl); bis(3,4-dimethylphenyl); bis(3,5-dimethylphenyl); di-(p-ethylphenyl); di-(p-octylphenyl); ethylphenyl; n-butylphenyl; n-octyl, phenyl; n-hexadecylphenyl; ethyl-o-tolyl; n-octyl-p-tolyl; bis(o-chlorophenyl); bis(m-chlorophenyl); bis(p-chlorophenyl); methyl-o- chlorophenyl; n-propyl-p-chlorophenyl; n-dodecyl-p-chlorophenyl; dibenzyl; methyl-naphyl; diallyl; cyclohexyl,1-hydroxycyclohexyl; bis(2-methyl-1-hydroxypentyl); benzyl, alpha-hydroxybenzyl; o-chlorobenzyl, alpha-hydroxy-o-chlorobenzyl; p-chlorobenzyl, alpha-hydroxy-p-chlorobenzyl; phenyl, alpha-methylbenzyl; cyclopentyl, 1-hydroxycyclopentyl; alpha-methylbenzyl, alpha-hydroxyl-alpha-methylbenzyl; 1-methylpentyl,1-hydroxy-1-methylpentyl; n-octyl,alpha-hydroxybenzyl; (1-hydroxy-1-methylethyl)isopropyl. Additionally, mixtures of one or more of the organophosphinic acids may be employed.

In carrying out the process of the present invention, the cobalt(II)-bearing aqueous solution, is contacted either by batch, continuously co-current or continuously countercurrent, with the extraction solvent. The aqueous solution should have an equilibrium pH of at least 3. It is preferred that the aqueous solution have an equilibrium pH of 4.0 to 6.0, more preferably, 4.5±0.5, since very low pH results in poor cobalt recovery, and very high pH is deleterious to phase disengagement. The ratio of aqueous to organic phase should be chosen to most effectively remove the cobalt(II). Aqueous to organic ratios of from 1:20 to 20:1 are believed to be effective, although other ratios may prove to be effective, depending upon the specific separation. The preferred dicyclohexylphosphinic acid solvent has been found to have a stoichiometric loading capacity of 12 gpl cobalt(II) per 100 gpl solvent. Phase contact is commonly achieved in devices called "mixer-settlers," although many other types of devices are available and suitable. In the mixer, one phase is dispersed within the other by stirring or some other appropriate form of agitation. The extraction solvent then forms a complex with the cobalt(II) which reports to the organic phase of the two-phase liquid mixture. The dispersion then flows to the settler where phase disengagement occurs under quiescent conditions. Generally, extraction is carried out between 0°-80° C., preferably 20°-70° C. Since elevated temperatures are required to obtain good phase disengagement, when dicyclohexlyphosphinic acid is employed a minimum temperature of 35° to 40° C. is recommended. The maximum temperature being determined by the diluent's flashpoint.

Depending on the cobalt(II) ratio in the aqueous feed solution, the cobalt(II)-loaded solvent may or may not have to be scrubbed to remove co-extracted metal ions in order to achieve the desired product purity. This is achieved by contacting the loaded solvent with a concentrated aqueous solution of a cobalt salt, approximately 30 g/l of cobalt(II), at aqueous phase/organic phase ratios between 0.05 and 2, preferably 0.1 and 1. Initial studies indicate that any co-extracted metals ions can be scrubbed from the loaded solvent with an aqueous solution of a cobalt salt. Generally, scrubbing is carried out at 0°-80° C., preferably about 20°-60° C.

The cobalt(II)-loaded extraction solvent, one part by volume, is stripped by contacting it with about 0.05-2.0 parts by volume, preferably about 0.1-0.5 part by volume, of a solution of a mineral acid at about 0°-80° C., preferably about 20°-60° C. at a pH of approximately 1.0. As a result, the cobalt(II) reports to the aqueous phase in the form of a soluble salt of the mineral acid employed. Phase contact may be achieved with mixer-settlers, or other suitable devices.

Suitable mineral acids include sulfuric, hydrochloric, hydrofluoric, nitric, and the like. The preferred mineral acid is sulfuric acid containing about 10-200 grams of sulfuric acid per liter, preferably about 30-100 grams per liter.

The stripped cobalt(II)-free solvent is recycled to the extraction circuit for treatment of incoming cobalt(II)-bearing solutions. The extractant may be recycled to the extraction circuit in the form of the free phosphinic acid. In this case pH control by the addition of a base is required in the extraction circuit. Alternatively, the recycled solvent may be pretreated and converted to the alkali metal or ammonium salt form before reporting to the extraction circuit. In the latter case, pH control in the extraction circuit is not required.

The cobalt(II)-bearing strip liquors may be treated by conventional means to recover cobalt metal, for example, by hydrogen reduction.

It is to be understood that although much of the preceding disclosure relates to liquid-liquid extraction, the principles and properties are believed to extend to those other extraction techniques previously set forth.

Whereas the exact scope of the instant invention is set forth in the appended claims, the following specific examples illustrate certain aspects of the present invention, and, more particularly, point out methods of evaluating the same. However, the examples are set forth for illustration only and are not to be construed as limitations on the present invention except as set forth in the appended claims. All parts and percentages are by weight unless otherwise specified.

EXAMPLE 1

The following example illustrates the ability of dioctylphosphinic acid to separate cobalt(II) and nickel(II) under different pH conditions.

The dioctylphosphinic acid is dissolved in an aliphatic petroleum diluent to obtain a concentration of 15% by volume, then a predetermined amount of 28% ammonium hydroxide is added to adjust the pH. An aliquot (50 mls) is skaken at 50° C. for 10 minutes with an equal volume of an aqueous solution containing 10.24/l of cobalt(II) and 10.12 g/l of nickel(II), respectively, as sulfate salts, to extract the cobalt(II) into the organic phase. The aqueous phase is then separated from the organic phase and analyzed for cobalt(II) content. Based on the results obtained, the percent cobalt- (II) extracted is calculated by mass balance. The percent nickel(II) extracted is determined by analyzing the organic phase. The results obtained are shown in Table I.

TABLE I

| Equilibrium pH | Percent Extraction | |
|---|---|---|
| | Co (II) | Ni (II) |
| 2.54 | 6.25 | 0 |
| 2.90 | 8.59 | 0.33 |
| 3.25 | 24.8 | 0.61 |
| 3.55 | 43.5 | 0.78 |
| 4.12 | 75.8 | 0.91 |
| 5.01 | 89.6 | 2.42 |
| 5.73 | 98.5 | 9.15 |

EXAMPLE 2

The procedure of Example 1 is followed except that dihexylphosphinic acid is used as the extractant, and the initial aqueous solution contains 10.38 g/l of cobalt(III), and 10.42 g/l of nickel(II), as sulfate salts. The results obtained are shown in Table II.

TABLE II

| Equilibrium pH | Percent Extraction | |
|---|---|---|
| | Co (II) | Ni (II) |
| 3.10 | 10.2 | 0.55 |
| 3.46 | 36.2 | 1.14 |
| 3.78 | 63.0 | 1.17 |
| 4.23 | 81.5 | 2.22 |
| 5.00 | 97.8 | 7.89 |
| 5.22 | 98.0 | 13.7 |

COMPARATIVE EXAMPLE A

The procedure of Example 1 is followed except that bis(2-ethylhexyl)hydrogen phosphate is used as the extractant, and the initial aqueous solution contains 10.38 g/l of cobalt(II), and 10.42 g/l of nickel(II), as sulfate salts. The results obtained are shown in Table III.

TABLE III

| Equilibrium pH | Percent Extraction | |
|---|---|---|
| | Co (II) | Ni (II) |
| 2.90 | 2.90 | 4.41 |
| 3.33 | 36.10 | 7.29 |
| 4.00 | 58.1 | 13.6 |
| 4.68 | 70.3 | 21.3 |
| 5.61 | 85.3 | 31.9 |

A comparison of the results obtained in Examples 1, 2, and Comparative Example A when the pH is calculated at pH 5.0, shows that the separation is of an order of magnitude higher than that of bis(2-ethylhexyl)hydrogen phosphate.

| Extractant | Separation Factor[1] |
|---|---|
| dihexylphosphinic acid | 520 |
| dioctylphosphinic acid | 348 |
| bis(2-ethylhexyl)hydrogen phosphate | 11 |

[1]Separation Factor = $\frac{E^\circ_A \text{Co (II)}}{E^\circ_A \text{Ni (II)}}$, where $E^\circ_A = \frac{\text{equilibrium concentration of the metal in the organic phase}}{\text{equilibrium concentration of the metal in the aqueous phase}}$

EXAMPLE 4

The procedure of Example 1 is followed except that 15% by volume of dihexylphosphinic acid is used in an aromatic petroleum solvent, together with 5% by volume of isodecanol, as a phase modifier, and the initial aqueous solution contains 2.06 g/l of cobalt(II), and 101.4 g/l of nickel(II), as sulfate salts. The results obtained are shown in Table IV.

TABLE IV

| Equilibrium pH | Percent Extraction | |
|---|---|---|
| | Co (II) | Ni (II) |
| 2.51 | 2.00 | 0.04 |
| 3.41 | 28.5 | 0.70 |
| 4.00 | 59.5 | 1.76 |
| 4.69 | 84.3 | 4.22 |
| 5.02 | 89.9 | 6.54 |
| 5.10 | 90.2 | 6.76 |

Based on the above data, the separation factor at pH 5.0 is 127.

COMPARATIVE EXAMPLE B

The procedure of Example 4 is followed in every detail except that bis(2-ethylhexyl)hydrogen phosphate is used instead of dihexylphosphinic acid. The results obtained are shown in Table V.

TABLE V

| Equilibrium pH | Percent Extraction | |
|---|---|---|
| | Co (II) | Ni (II) |
| 3.02 | 10.4 | 3.16 |
| 3.50 | 18.0 | 3.35 |
| 3.59 | 22.6 | 4.54 |
| 4.65 | 22.6 | 9.07 |
| 5.21 | 22.6 | 13.6 |

Based on the above data, the separation factor at pH 5 is 2.3. Comparison with the separation factor at pH 5 in Example 4 shows that dihexylphosphinic acid is an order of magnitude more selective than bis(2-ethylhexyl)hydrogen phosphate.

EXAMPLE 6

The procedure of Example 1 is followed except that 15% by volume of diisobutylphosphinic acid is used in an aromatic petroleum solvent, together with 5% by volume of isodecanol, and the initial aqueous solution contains 10.20 g/l of cobalt(II), and 10.12 g/l of nickel(II), as sulfate salts. The results obtained are shown in Table VI.

TABLE VI

| Equilibrium pH | Percent Extraction | |
|---|---|---|
| | Co (II) | Ni (II) |
| 2.90 | 10.6 | 0.05 |
| 3.24 | 23.1 | 0.07 |
| 3.55 | 44.9 | 0.11 |
| 3.77 | 63.9 | 0.12 |
| 3.96 | 80.4 | 0.15 |

EXAMPLE 7

The following example illustrates treatment of the cobalt(II)-loaded solvent for the removal of co-extracted nickel(II) to achieve a final product wherein the weight ratio of cobalt(II) to nickel(II) is greater than 500.

The procedure of Example 4 is followed at an equilibrium pH of the aqueous phase of 4.54 to obtain a loaded solvent containing 1.56 g/l of cobalt(II), and 4.92 g/l of nickel(II). The loaded solvent is then shaken for 5 minutes at 50° C. with an equal volume (50 mls) of an aqueous solution of cobalt sulfate [30 g/l of cobalt(II)]. The equilibrium pH of the aqueous phase is adjusted to 5 with ammonium hydroxide and the two phases are shaken again for 5 minutes at 50° C. This is repeated for a total of four contacts. At this point, analysis shows that the organic phase contains 5.88 g/l of cobalt(II), and 0.01 g/l of nickel(II).

EXAMPLE 8

The loaded solvent of Example 7 (100 mls), containing 1.56 g/l of cobalt(II), and 4.92 g/l of nickel(II), is shaken with 3% by weight $H_2SO_4$ in water (25 mls) at 50° C. for 5 minutes. Analysis shows that 92.7% of nickel(II), and 25.6% of cobalt(II), has been stripped from the organic phase. This result shows that the nickel(II) in the loaded solvent is more easily stripped therefrom than cobalt(II).

EXAMPLE 9

The procedure of Example 4 is followed except that the initial aqueous solution contains 13.2 g/l of cobalt(II), as cobalt sulfate. A 50-ml aliquot of the extraction solvent is contacted for 10 minutes at 50° C., with a 50-ml aliquot of the aqueous solution, the aqueous phase is separated, and the cobalt(II)-loaded solvent is contacted again with a fresh 50-ml aliquot of aqueous feed solution. This is repeated for a total of 4 contacts with fresh aqueous feed solution. The cobalt(II)-loaded solvent is then contacted for 5 minutes at 50° C. with 5% sulfuric acid at aqueous phase/organic phase (A/O) volume ratios of ⅓, and ½, respectively. The results obtained are shown below.

| A/O | Percent Cobalt (II) Stripped |
|---|---|
| 1/3 | 80.8 |
| 1/2 | 100 |

The above results show that when A/O is ½ a quantitative recovery of cobalt(II) from the organic phase is obtained.

EXAMPLE 10

The procedure of Example 1 is followed except that a solution of 5.5% v/v of the 1,3,5-dioxaphosphorine-2,4,6-triisopropyl-5-hydroxy-5-oxide extractant plus 5% v/v isodecanol in Solvesso ® 100 (Exxon Corp.) is used. The initial sulfate solution contained 1.74 g/l Co and 104.8 g/l Ni. The results obtained are shown in Table VII. A separation factor of 5740 is calculated from the data at pH 4.64.

TABLE VII

| Equilibrium pH | % Metal Extraction | |
|---|---|---|
| | Co | Ni |
| 2.50 | 0 | 0 |
| 3.50 | 25.3 | 0.16 |
| 4.28 | 75.4 | 0.33 |
| 4.64 | 97.0 | 0.56 |

EXAMPLE 11

The procedure of Example 1 is followed except that a solution of 15% v/v of the dicyclohexylphosphinic acid extractant plus 5% v/v isodecanol in Solvesso ® 100 is used. The initial sulfate solution contained 2.16 g/l Co and 110.4 g/l Ni. From the data shown in Table VIII a separation factor of 4836 is calculated at pH 4.65.

TABLE VIII

| Equilibrium pH | % Metal Extraction | |
|---|---|---|
| | Co | Ni |
| 2.58 | 0.74 | 0.03 |
| 3.78 | 69.1 | 0.10 |
| 4.05 | 73.1 | 0.10 |
| 4.65 | 95.0 | 0.39 |

EXAMPLE 12

The procedure of Example 1 is followed except that a solution of 180 grams per liter of the bis(2,4,4-trimethylpentyl)phosphinic acid extractant plus 5% v/v isodecanol in Varsol ® DX-3641 is used. The initial sulfate solution contained 1.90 g/l Co and 103.6 g/l Ni. A separation factor of 407 at pH 5.12 is calculated from the data shown in Table IX.

TABLE IX

| Equilibrium pH | % Metal Extraction | |
|---|---|---|
| | Co | Ni |
| 2.63 | 3.1 | 0 |
| 3.62 | 29.5 | 0.89 |
| 4.30 | 57.6 | 0.99 |
| 4.89 | 83.5 | 1.63 |
| 5.00 | 88.5 | 1.93 |
| 5.12 | 91.2 | 2.48 |

EXAMPLE 13

The procedure of Example 1 is followed except that a solution of 135 grams per liter of the bis(3,3-dimethylbutyl)phosphinic acid extractant in Solvesso ® 100 is used, in combination was 5% v/v isodecanol. The initial aqueous sulfate solution contained 2.07 g/l Co and 95.5 g/l Ni. From the data in Table X separation factor of 219 is calculated at pH 4.68.

TABLE X

| Equilibrium pH | % Metal Extraction | |
|---|---|---|
| | Co | Ni |
| 2.57 | 3.4 | 0.02 |
| 3.46 | 28.8 | 0.35 |
| 3.70 | 44.0 | 0.55 |
| 4.68 | 86.2 | 2.76 |

EXAMPLE 14

The procedure of Example 1 is followed except that a solution of 15% v/v of the di-n-octylphosphinic acid extractant in Kermac ® 470B is used. The initial sulfate solution contained 2.12 g/l Co and 104.2 g/l Ni. A separation factor of 86 at pH 5 is calculated from the data shown in Table XI.

TABLE XI

| Equilibrium pH | % Metal Extraction | |
|---|---|---|
| | Co | Ni |
| 3.40 | 41.6 | 1.45 |
| 4.23 | 70.9 | 2.46 |
| 4.81 | 84.4 | 4.93 |
| 5.05 | 85.0 | 6.96 |
| 5.38 | 84.4 | 9.31 |

COMPARATIVE EXAMPLE C

The procedure of Example 1 is followed except that a solution of 15% v/v of the octylphosphonic acid, decyl ester extractant plus 5% v/v isodecanol in Solvesso ® 100 is used. The initial aqueous sulfate solution contained 2.06 g/l Co and 101.4 g/l Ni. From the data shown in Table XII, a separation factor of 21 is calculated at a pH 4.89.

TABLE XII

| Equilibrium pH | % Metal Extraction | |
|---|---|---|
| | Co | Ni |
| 2.72 | 4.76 | 1.73 |
| 3.13 | 17.4 | 2.41 |
| 3.85 | 35.6 | 5.13 |
| 4.35 | 47.0 | 7.32 |
| 4.63 | 64.0 | 8.95 |
| 4.89 | 69.2 | 9.71 |

EXAMPLE 15

The procedure of Example 1 is followed except that a solution of 180 gpl of the di-2,2,4-trimethylpentylphosphinic acid in Solvesso ® 100 modified with 5% v/v isodecanol is used. The initial sulfate solution contained 1.97 gpl Co and 93.6 gpl Ni. The A/O ratio is 1.0 and the temperature is maintained at 50° C. for a ten (10) minute contact. Test results are given in Table XIII.

| % Metal Extraction | | Co/Ni Separation | Equilibrium |
|---|---|---|---|
| Co | Ni | Factor | pH |
| 3.09 | 0 | — | 2.81 |
| 38.2 | 0.28 | 217 | 3.99 |
| 85.1 | 1.10 | 516 | 4.94 |
| 97.8 | 2.22 | 1975 | 5.33 |
| 100 | 3.10 | ∞ | 5.52 |

EXAMPLE 16

The procedure of Example 1 is followed except that a solution of 180 gpl of the di-2,4,4'-trimethylpentylphosphinic acid in Varsol ® DX-3641 modified with 5% v/v isodecanol is used. The initial sulphate solution contained 1.90 gpl Co and 103.6 gpl Ni. The A/O ratio is 1.0 and the temperature is maintained at 50° C. for a 10-minute contact. Test results are set forth in Table XIV.

TABLE XIV

| % Metal Extraction | | Co/Ni Separation | Equilibrium |
|---|---|---|---|
| Co | Ni | Factor | pH |
| 3.1 | 0 | — | 2.63 |
| 29.5 | 0.89 | — | 3.62 |
| 57.6 | 0.99 | 135 | 4.30 |
| 83.5 | 1.63 | 305 | 4.89 |
| 88.5 | 1.93 | 391 | 5.00 |
| 91.2 | 2.48 | 407 | 5.12 |

EXAMPLE 17

The procedure of Example 1 is followed except that a solution of 169 gpl 2,4,4'-trimethylpentyl,cyclohexyl phosphinic acid in Solvesso ® 100 modified with 5% v/v isodecanol is used. The initial sulphate solution contains 2.05 gpl cobalt and 102.4 gpl nickel. The A/O ratio is 1.0, the temperature is maintained at 50° C. for a five (5) minute contact. Test results are given in Table XV.

TABLE XV

| % Metal Extraction | | Co/Ni Separation | Equilibrium |
|---|---|---|---|
| Co | Ni | Factor | pH |
| 85.1 | 0.78 | 726 | 4.70 |
| 95.6 | 1.66 | 1274 | 5.18 |
| 98.4 | 3.19 | 1910 | 5.53 |
| 99.9 | 4.64 | 21030 | 5.80 |

EXAMPLE 18

26 g. of polystyrene beads are placed in a rotary evaporator with 5.4 g. of dihexylphosphinic acid dissolved in toluene. The toluene is stripped and the polystyrene beads are transferred to a Jones reductor in the form of an aqueous slurry. 100 mls. of a cobalt-nickel sulphate leach liquor (approximately 2.2 gpl Co, 100 gpl Ni, initial pH=6.2) are passed through the column at a rate of approximately 10 mls/min.

The beads developed a distinct blue color, indicating formation of the tetrahedrally co-ordinated Co-phosphinic acid complex. The column is then washed with distilled water (pH=5.6) until low nickel assays (10 ug/ml) are observed in the wash water. Analysis indicated that a cobalt recovery of 15% is achieved.

The column is then eluted with 10% $H_2SO_4$. The eluate is found to contain 604 ug Co/ml and 97 ug Ni/ml. These experiments demonstrate the use of supported phosphines in this application.

EXAMPLE 19

Following the procedure of Example 4 in every material detail except that the extraction solvent now contains 1 percent by volume of diphenylphosphinic acid, substantially similar results are obtained.

EXAMPLE 20

Following the procedure of Example 4 in every material detail except that the extraction solvent now contains 1 percent by volume of bis(4-methylphenyl)phosphinic acid, substantially similar results are obtained.

EXAMPLES 21-23

Following the procedure of Example 9 in every material detail except that in place of the sulfuric acid solution there is now employed a solution of hydrochloric, hydrofluoric, or nitric acid, substantially similar results are obtained.

EXAMPLE 24

The procedure of Example 1 is followed except that a solution of 100 gpl of dicyclohexylphosphinic acid in Solvesso ® 150 modified with 10% v/v tridecanol is used. This solvent is loaded with 1 gpl $Fe+3$. The A/O ratio is 3.0, the temperature is maintained at 50° C. for a 5-minute contact with 300 gpl $H_2SO_4$ for stripping. Test results are as follows:

| A/O | % $Fe^{+3}$ Stripped |
|---|---|
| 0.5 | 100 |
| 1 | 93 |
| 2 | 96 |

The data indicate the ability of $H_2SO_4$ to strip co-extracted impurity metals from the organophosphinic acid. Analogous results are obtained with Cu and Zn.

EXAMPLE 25

Following the procedure of Example 1 in every material detail except that in place of the cobalt(II) and nickel(II) being sulfate salts they are as nitric salts, chloride salts or fluoride salts, substantially similar results are obtained.

EXAMPLE 26

When a solution of 30 parts of styrene, 20 parts of 55% divinyl benzene, 0.5 parts of azobis(isobutyronitrile) and 25 parts of bis(2,4,4-trimethylpentyl) phosphinic acid is introduced into a starting mixture of 400 parts of 0.2% methyl cellulose solution and the mixture is heated under nitrogen atmosphere with rapid stirring at 80° C. for 10 hours; and further heated for 1 hour at 90° C. then, after cooling, if the resulting polymer beads are filtered, washed with water, and then dried in a vacuum oven, the resultant polymer beads will extract cobalt(II) from a cobalt(II)-bearing solution.

EXAMPLE 27

The procedure of Example 1 is followed in every material detail except that a solution of 100 gpl of dicyclohexylphosphinic acid in Solvesso 150 modified with 10% v/v tridecanol is used. The initial sulphate solution contains 0.73 gpl iron, 1.72 gpl zinc, 0.67 gpl copper and 0.92 gpl cobalt. The A/O is 0.5, the temperature is maintained at 50° C. for a five (5) minute contact. Test results are given in Table XVI.

TABLE XVI

| % Metal Extraction | | | | Equilibrium |
| --- | --- | --- | --- | --- |
| Fe | Zn | Cu | Co | pH |
| 100.0 | 100.0 | 98.0 | 94.8 | 4.30 |

EXAMPLE 28

When the procedure of Example 15 is followed in every material detail except that the cobalt(II) concentration is 0.1 gpl and there are no other metal ions in the initial solution above 1 ppm (including nickel(II) ions) substantially similar results are obtained.

What is claimed is:

1. A composition for use in extraction comprising an inert material whereupon an organophosphinic acid of the structure:

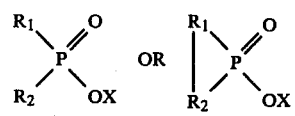

is adsorbed entrained or chemically bound wherein $R_1$, $R_2$ are individually substituted or unsubstituted alkyl, cycloalkyl, alkoxyalkyl, alkylcycloalkyl, aryl, alkylaryl, aralkyl or cycloalkylaryl radicals and X is either hydrogen or a salt-forming radical.

2. The composition of claim 1 wherein the inert material is diatomaceous earth.

3. The composition of claim 1 wherein the inert material is a polystyrene bead.

* * * * *